United States Patent Office 2,966,090
Patented Dec. 27, 1960

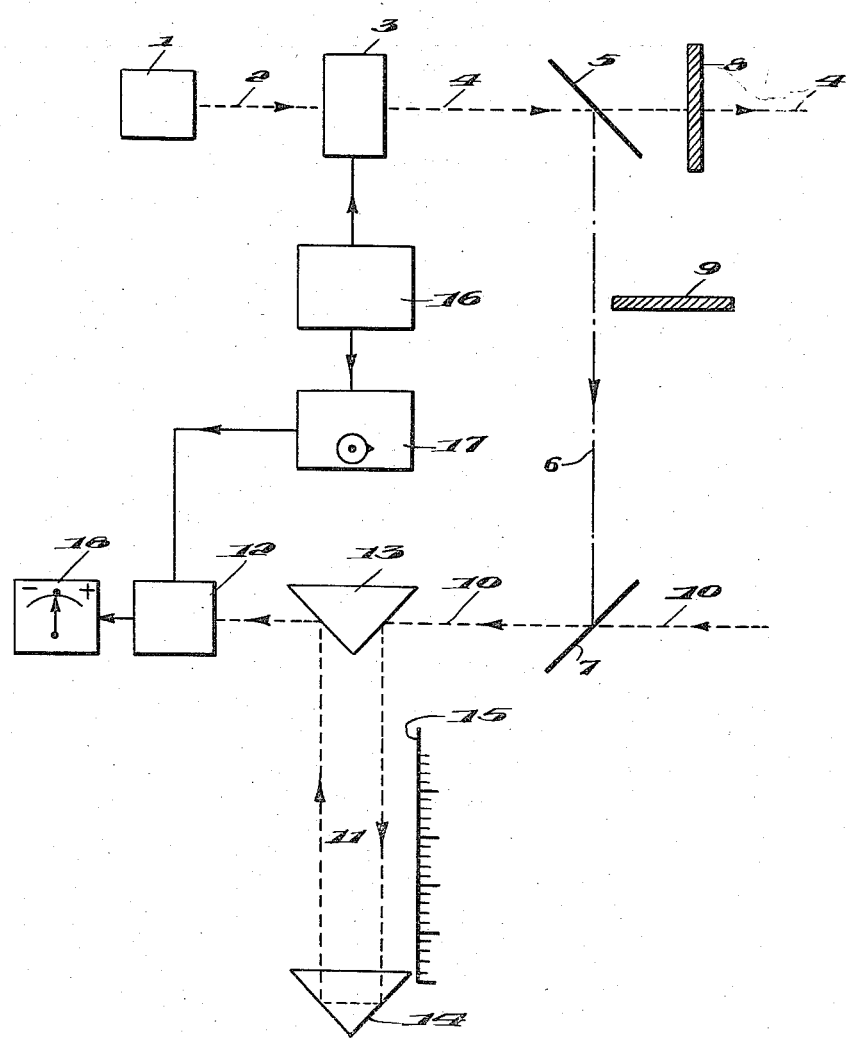

2,966,090

OPTICAL DISTANCE MEASURING DEVICE

Karl Otto Ragnar Schöldström, Lidingo, Sweden, assignor to Svenska Aktiebolaget Gasaccumulator, Lidingo, Sweden, a corporation of Sweden Filed Dec. 12, 1955, Ser. No. 552,513

Claims priority, application Sweden Dec. 28, 1954

3 Claims. (Cl. 88—1)

The invention refers to a device for the optical measurement of distances having a transmitter for transmitting modulated light and a receiver for receiving the light after its reflection at a distant object, and also means for phase comparison of the transmitted and the received light.

The invention is characterized by an adjustable optical delay means inserted in the path of the light and by means for direct feed-back of the transmitted light to the receiver via the delay means.

The device according to the invention is a simplification over a prior device as shown in U.S. application No. 284,835 filed April 28, 1952 and assigned to the same assignee as the present application, now abandoned, and as described in an article entitled "Surveying with the Velocity of Light" which appeared in "Surveying and Mapping," July–September 1954 on pages 283–292, in which an optical delay means is adapted to be inserted so as to replace the distance to be measured, it being possible directly upon an adjustment of the light delay means being made to obtain a distance reading instead of merely an adjustment of an electrical delayer, which must then be calibrated against the optical one. This is equivalent to a substantial gain in time. The device is of particular advantage at high modulation frequencies, since the optical delay means can then be of small dimensions and thus have small optical losses.

An embodiment of the invention is shown on the attached drawing.

The device comprises a light source 1, from which is transmitted a light beam 2. The beam passes through a modulator 3 and the outgoing modulated beam 4 from the modulator is thrown towards the distant object whose distance is to be determined. In the path of the light beam there is inserted a reflector 5, which deflects a portion of the beam 6 to a further reflector 7, which is inserted in the path of the returning beam, obtained after reflection at the object. A screen 8 can be used for blocking the outgoing beam and a screen 9 for blocking the reflected portion 6 of the beam coming from the reflector 5. Ordinarily, one of the screens is in its blocking position, as will be apparent from a description of the function of the device.

The reflected beam 10 passes through the reflector 7 and via an adjustable optical delay means 11 to a light receiver 12. The delay means 11 comprises a pair of prisms 13, 14, of which the prism 14 is adjustable so as to result in a path of variable length for the beam 10. The length can be read from a scale 15.

The modulator 3 is controlled by an oscillator 16, so that the outgoing beam 4 is modulated with the output voltage from the oscillator. This output voltage is further applied through an electrical delay means 17 to the receiver 12, which may for instance comprise a phototube, and in which a phase comparison takes place between the output voltage from the delay means 17 and the modulation of the incoming light 10. Phase equality is indicated by a null instrument 18.

Obviously, the illustrated device for comparing the phase of the transmitted beam 4, which is assumed to be equal to the phase of the output of the oscillator 16, and the phase of the received beam 10 can be exchanged for any other phase comparing device without deviating from the scope of the invention. Such an apparatus is described in an article entitled "A Preliminary Determination of the Velocity of Light" which appeared in "Arkiv För Mateinatik, Astronomi Och Fysik" published by the Royal Swedish Academy of Science, vol. 36 A, No. 20, 1949.

The operation of the device illustrated is as follows:

With the blocking screens 8 and 9 in the position shown in the figure and with the delay means 11 in zero adjustment, the electrical delay means 17 is first adjusted so as to make the instrument 18 indicate phase equality. The beam 6 is then blocked by moving screen 9 to a blocking position and the beam 4 released by moving screen 8 from the light path. The delay means 11 is now adjusted until a zero reading is again obtained on the instrument 18. Since the frequency of the modulation impressed on the transmitted light is known, the sought-for distance can be determined, except for an uncertainty with regard to the number of whole modulation pulse lengths. For a zero reading of the instrument 18 it is obvious that the length of distance traversed by the beam 4 and the beam 10 from the reflector 5 to the reflector 7 is equal to an integral number of modulation pulse lengths minus the length for which the delay means 11 is adjusted and the length traversed by the beam 6 between the reflectors 5 and 7.

What is claimed is:

1. An optical distance measuring device comprising an oscillator for generating a modulation signal, a light transmitter including a modulator responsive to said modulation signal for modulating the transmitted light, means for receiving the modulated light after reflection from an object at the other end of a distance to be measured, said receiving means including a variable optical delay means in the light path, phase responsive means for comparing the modulation phase of the received light with the phase of said modulation signal, variable electrical delay means for delaying the modulation signal to correspond to the phase of the reflected light, and switching means for causing the transmitted light to bypass the distance to be measured directly to said receiving means, whereby said modulated light is passed through said optical delay means after reflection from the distance to be measured and when said switching means causes said light to bypass said distance.

2. A distance measuring device according to claim 1, in which said phase responsive means comprises a null meter.

3. A distance measuring device according to claim 1, in which said optical delay means comprises a plurality of adjustable prisms.

References Cited in the file of this patent

UNITED STATES PATENTS

| | | |
|---|---|---|
| 1,116,069 | Jacob | Nov. 3, 1914 |
| 2,234,329 | Wolff | Mar. 11, 1941 |
| 2,490,899 | Cohen | Dec. 13, 1949 |
| 2,571,937 | Peck | Oct. 16, 1951 |
| 2,725,800 | Dewhurst | Dec. 6, 1955 |

OTHER REFERENCES

Fundamentals of Optics, Jenkins & White, 2nd edition, McGraw-Hill Book Co., 1950, New York (pages 386–389 relied upon).

"Surveying with the Velocity of Light," article by Compton-Surveying and Mapping, vol. 14, No. 3, pages 283–292, July–September 1954.